Feb. 1, 1944.   J. S. McDONNELL, JR   2,340,396
AIRPLANE POWER PLANT COOLING
Filed May 11, 1940   9 Sheets-Sheet 1

Feb. 1, 1944. J. S. McDONNELL, JR 2,340,396
AIRPLANE POWER PLANT COOLING
Filed May 11, 1940 9 Sheets-Sheet 6

Patented Feb. 1, 1944

2,340,396

UNITED STATES PATENT OFFICE 2,340,396

AIRPLANE POWER PLANT COOLING

James S. McDonnell, Jr., Clayton, Mo., assignor to McDonnell Aircraft Corporation, Robertson, Mo., a corporation of Maryland Application May 11, 1940, Serial No. 334,554

3 Claims. (Cl. 244—57)

My invention relates to airplanes and engines, particularly to the cooling of the airplane power plant and to the control of the boundary layer of the wing. It has for its principal objects to provide an efficient means for cooling the engine coolant, the engine lubricant, and the coolant for a liquid cooled intercooler for the supercharged air for the engine. A further principal object is the utilization of the cooling system to control the boundary layer of the wing to increase the lift coefficient and to increase the maximum ratio of lift to drag. Another object is to increase the maneuverability of the airplane by virtue of the increased lift coefficient. Another object is to provide means for reducing the speed of an airplane when landing and for enabling any particular airplane to be landed at a steeper angle than would be posisble without the use of my invention. Another object is to provide smooth airflow over the wings at all angles of attack, especially at a high angle of attack and at a speed approaching stalling speed. Other objects and advantages will appear hereinafter.

The invention consists principally in an airplane power plant coolant cooling system which, besides its direct advantages in the operation of the power plant itself, has the further important advantage of controlling the boundary layer of the wing to increase the lift coefficient. More specifically, the invention consists in a radiator cooling system for the coolant of a liquid cooled engine and for the lubricant of the engine, in locating the cooling system inside the wing and fuselage, in supplying air to said radiator system by means of air ducts extending through the rear portions of the wings and communicating with ports opening into the upper surfaces of the wings, in mounting surface radiators in the leading edges of the wings, said radiators cooling the coolant of a liquid cooled intercooler, and in providing driving connections for the radiator fan whereby said fan may be driven by the propellers when said propellers are windmilling, due to the engine not operating. The invention further consists in the airplane and engine, in the airplane power plant cooling system and in the parts and combinations and arrangements of parts hereafter described and claimed.

In the accompanying drawings, wherein like reference characters indicate like parts wherever they occur.

Figure 1:
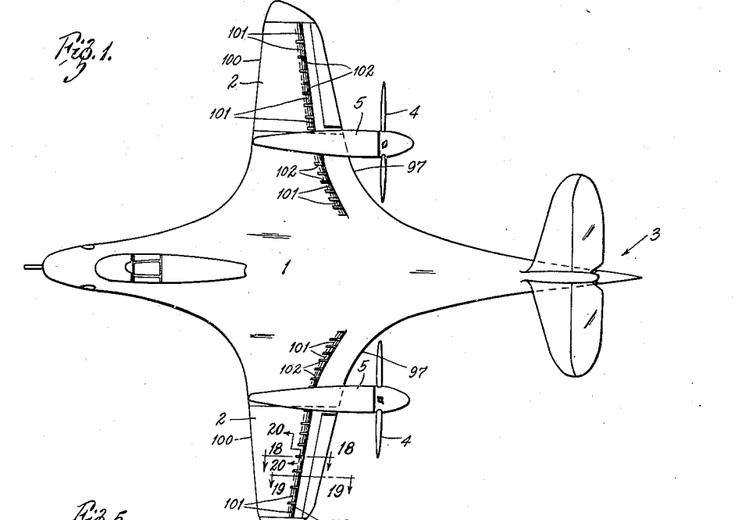
Fig. 1 is a top plan view of an airplane having a power plant cooling system embodying my invention.
Figures 2, 4:
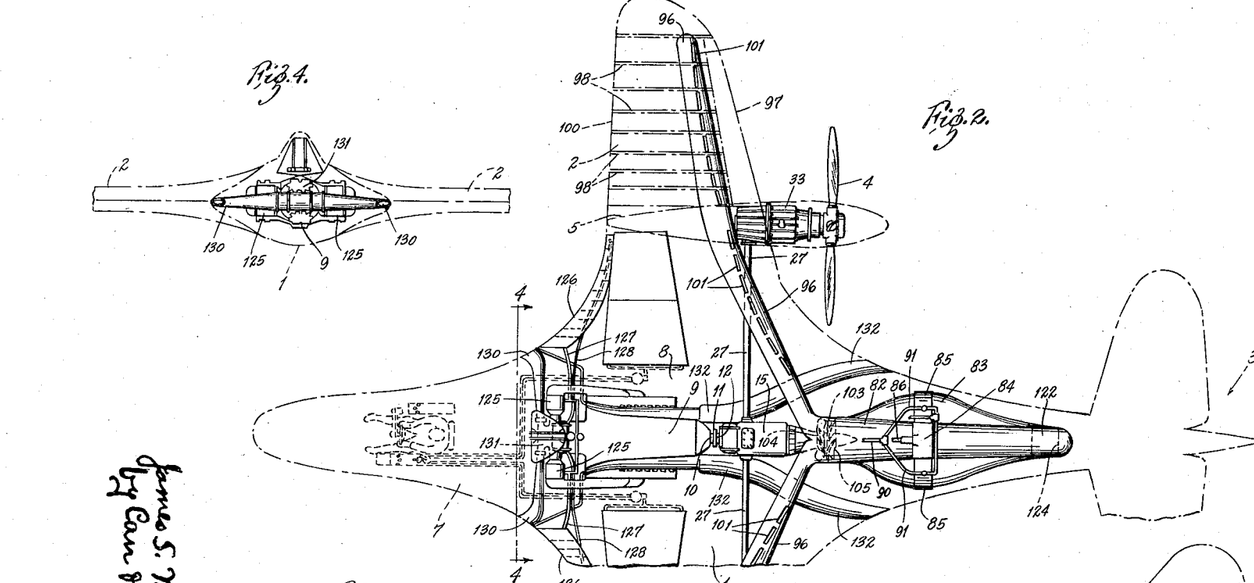
Fig. 2 is a partial plan view with portions of the wing structure and other parts removed.
Fig. 4 is a sectional view on the line 4—4 in Fig. 2.
Figure 3:
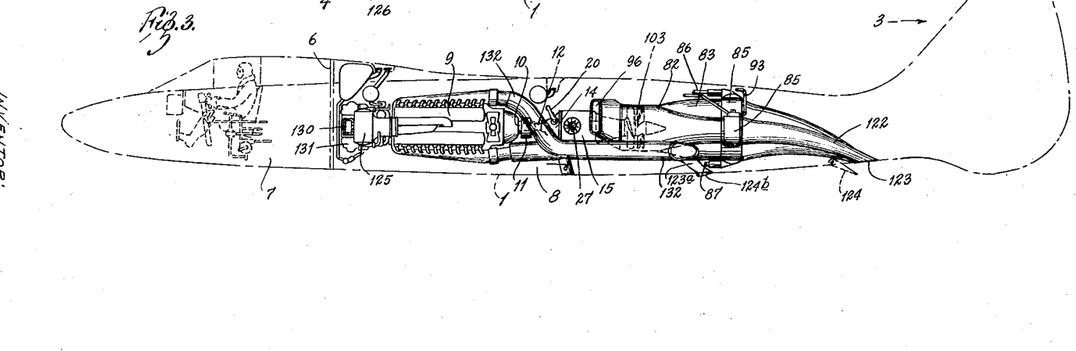
Fig. 3 is a side elevation of the power plant and cooling system.

In the drawings is illustrated an airplane comprising a fuselage 1, wings 2 extending therefrom and merging thereto, a rudder structure 3 and two pusher propellers 4, with nacelles 5 therefor. The fuselage 1 is shown as being divided into compartments by means of a fire wall 6, which may be a door or may have doors therein, the front compartment 7 accommodating the pilot, the control mechanism and the armament of a military airplane and the rear compartment 8 housing the engine 9, cooling system and other apparatus.

The drawings illustrate diagrammatically a liquid cooled engine 9. The construction of the engine itself forms no part of this invention and the engine is shown only in external outline.

Figures 7, 8:
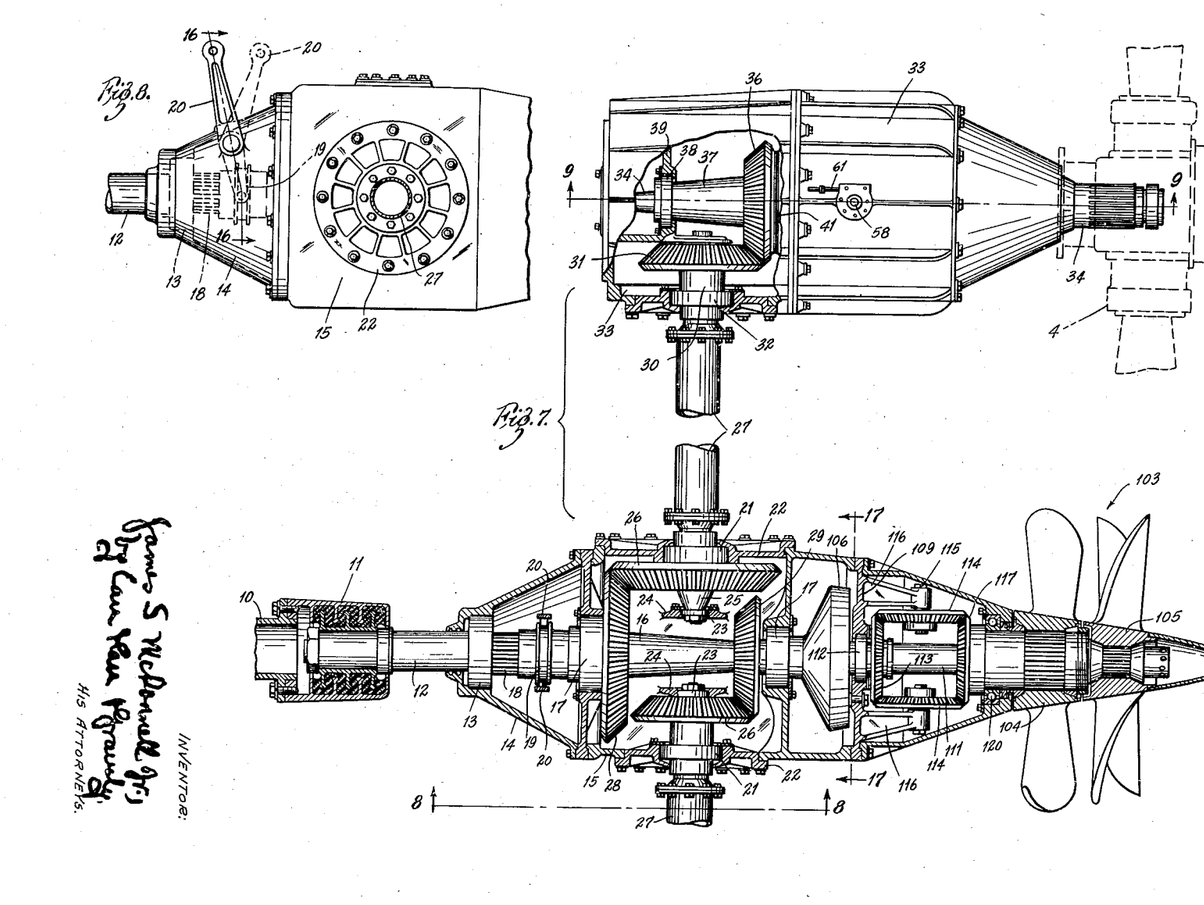
Fig. 7 is a horizontal sectional view of the central gear housing and of one propeller gear housing, with some parts shown in plan.
Fig. 8 is a side elevation of a portion of said central gear housing, as shown by the line 8—8 in Fig. 7.

The drive shaft 10 of the engine 9 extends rearwardly therefrom and is secured, as by means of a vibration damping connection 11, to a projecting coupling shaft section 12, whose end is supported in a bearing 13 in the nosing 14 of a housing 15. In axial alinement with the coupling shaft 12 is a drive shaft 16 which is rotatably mounted in bearings 17 in said housing 15. The engine shaft 10 and the drive shaft 16 have longitudinal splines 18 on their adjacent ends and an internally splined clutch 19 or coupling member is mounted thereon, the coupling member being slidable by means of a suitable lever 20 to directly drive the drive shaft 16 from the engine shaft 10 or to entirely disengage the drive shaft 16 from the engine shaft 10.

Rotatably mounted in bearings 21 in the end walls 22 of the housing 15 and in bearings 23 in posts 24 in said housing disposed at right angles to the axis of the drive shaft 16 are the hub portions 25 of gears 26 which are secured to the ends of countershafts 27 that extend into the wings 2. A gear 28 fixed to the drive shaft 16 meshes with one of said countershaft gears 26 and a gear 29 fixed to said drive shaft on the other side of the countershafts meshes with the gear 26 of the other countershaft, the gear ratio in each case being 1 to 1. By this arrangement, the two countershafts 27 are rotated in the same direction and at the same speed as the engine shaft 10. The outermost end of each countershaft 27 is secured in the hollow hub 30 of a gear 31, said gear hub 30 being mounted in a bearing 32 in the inner end wall of a housing 33 in which is mounted suitable transmission or change speed gearing hereinafter described, by means of which each countershaft 27 rotates the shaft 34 on which one of said propellers 4 is mounted.

Each propeller shaft 34 is supported in a plurality of bearings 35 in the housing 33. The gear 31 on the end of the countershaft meshes with a gear 36 on a hollow shaft 37 that surrounds a portion of said propeller shaft 34, the gear ratio being 1 to 1. Said hollow shaft 37 is mounted in a roller bearing 38 in a wall 39 of said housing 33 at one end and at the other or gear end, a roller bearing 40 is interposed between said hollow shaft 37 and the propeller shaft 34.

Figures 9, 10, 11, 12:
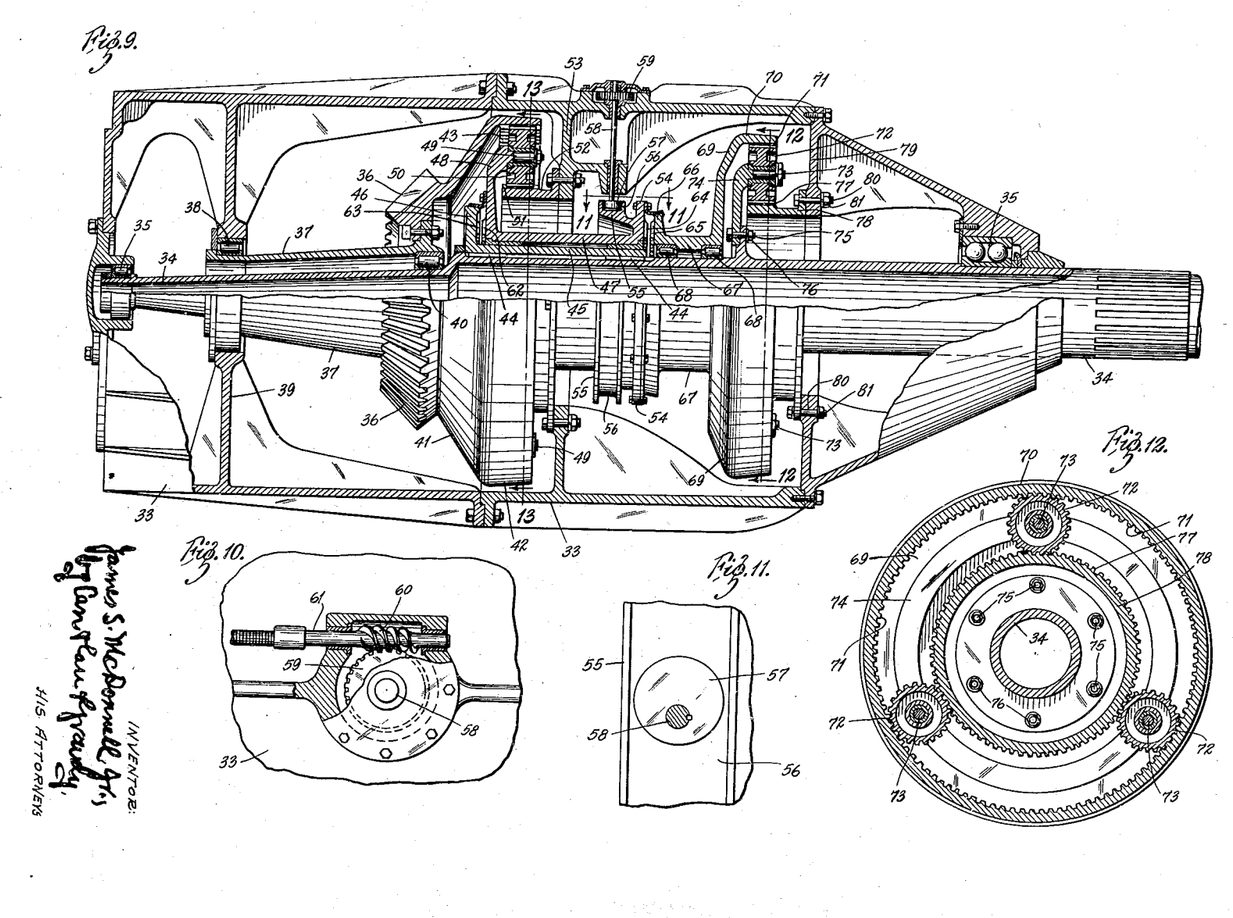
Fig. 9 is an enlarged sectional view on the line 9—9 in Fig. 7, a portion of the internal mechanism being shown in elevation.
Fig. 10 is a plan view, partly in section, illustrating the operating means for a propeller clutch member.
Fig. 11 is a view taken on the line 11—11 in Fig. 9.
Fig. 12 is a vertical sectional view on the line 12—12 in Fig. 9.
Figures 13, 16, 17, 20:
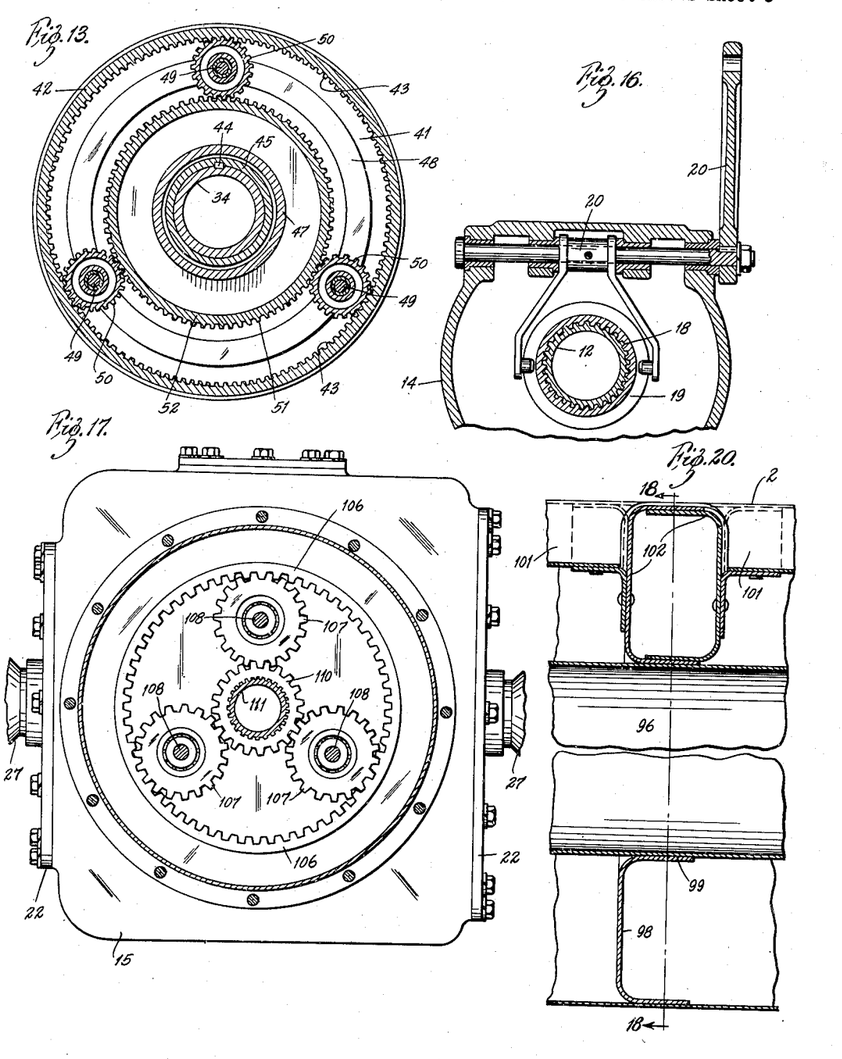
Fig. 13 is a vertical sectional view on the line 13—13 in Fig. 9.
Fig. 16 is an enlarged sectional view on the line 16—16 in Fig. 8.
Fig. 17 is a vertical sectional view on the line 17—17 in Figs. 7 and 15.
Fig. 20 is a vertical sectional view on the line 20—20 in Figs. 1 and 18.
Figure 14:
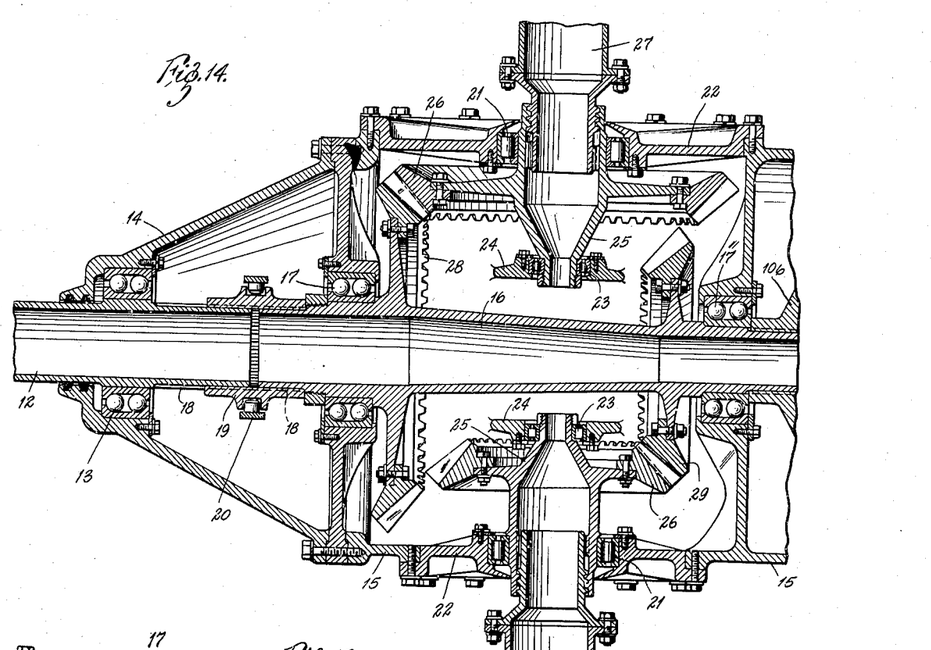
Fig. 14 is an enlarged horizontal sectional view, similar to Fig. 7, showing the front half of the central gear housing.
Figure 15:
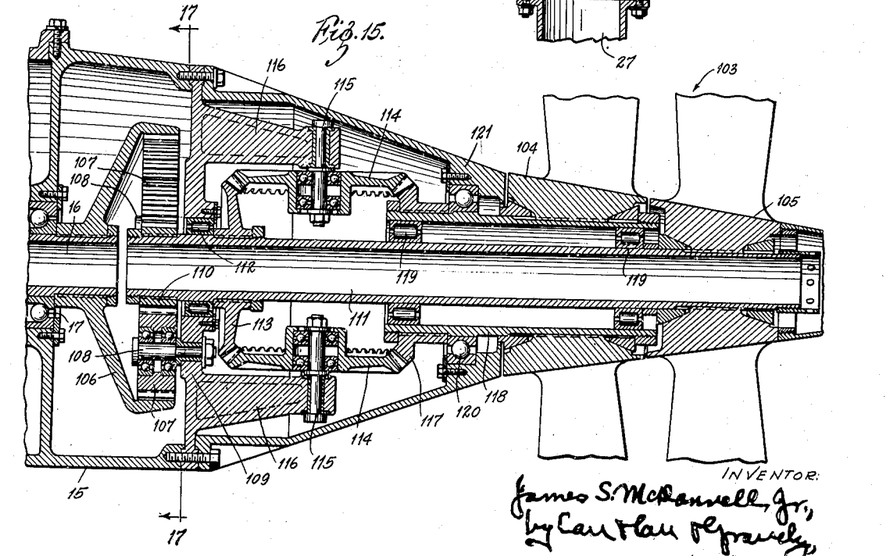
Fig. 15 is an enlarged horizontal sectional view of the rear half of said housing.
Figure 18:
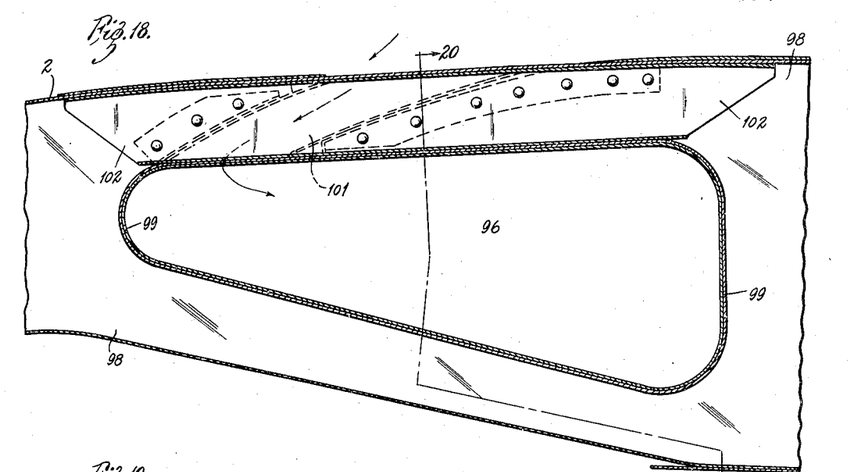
Fig. 18 is a vertical sectional view on the line 18—18 in Figs. 1 and 20.
Figure 19:
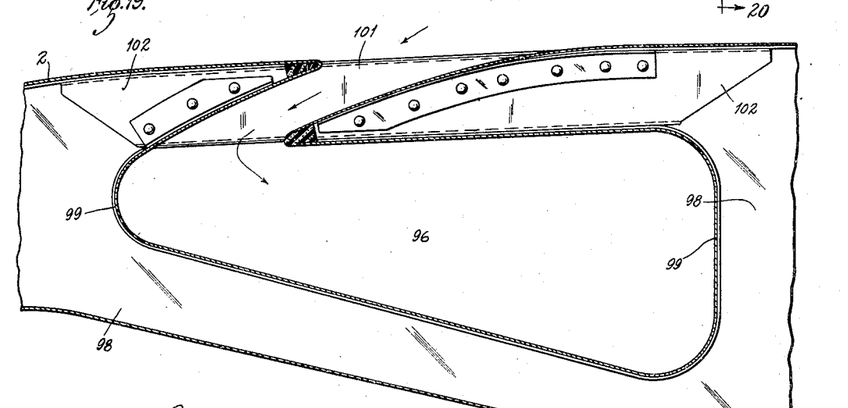
Fig. 19 is a vertical sectional view on the line 19—19 in Fig. 1.

Flaring from the outer periphery of the gear 36 is a conical web 41 having a cylindrical end portion 42 in which is an internal gear 43. Fixed on the propeller shaft 34, as by keys 44, is a sleeve 45 which has an annular flange 46 at the end remote from the propeller 4 and within said conical web member 41. Rotatably mounted on said sleeve 45 is a tubular member 47 with an annular end flange 48 adjacent to said flange 46 of said fixed sleeve 45 and of considerably larger diameter. Secured to the face of said flange 48 remote from said flange 46 of said fixed sleeve 45 are a plurality of stub shafts 49 each carrying a gear 50 that meshes with the internal gear 43 and that also meshes with gear teeth 51 on a fixed hub member 52 secured to an internal wall 53 of said housing 33. Said tubular gear carrier 47 is provided with a flange 54 at its other end and with a projecting annular rib 55 having a groove 56 into which extends a cam or eccentric 57 that is mounted on a shaft 58 that is journaled in the housing, said shaft being provided with an external worm gear 59 for driving it. A worm 60 whose shaft 61 is operated by any suitable means (not shown in the drawings) actuates said worm gear 59. By rotation of said shaft 58, the cam 57 shifts said gear carrier 47 longitudinally into position so that clutch teeth 62 on the face of the gear carrying flange 48 thereof mesh with clutch teeth 63 on the inner face of the flange 46 on the fixed sleeve 45, so that clutch teeth 64 on the other flange 54 mesh with clutch teeth 65 on the face of a flange 66 of a rotatable sleeve 67 mounted on bearings 68 on the propeller shaft 34 or into neutral disengaged position, as shown in the drawings.

Said rotatable member 67 has an annular disk 69 with a cylindrical peripheral flange 70 which is provided with internal gear teeth 71 meshing with pinions 72 mounted on stub shafts 73 on a flange 74 that is secured to the propeller shaft 34 as by bolts 75 and nuts 76. The teeth of said pinions 72 also mesh with teeth 77 on a fixed hub member 78 secured to a wall 79 of said housing as by bolts 80 and nuts 81.

As appears from the above description, the gear 26 on each countershaft 27 continually drives the gear 36 on the rotatable hollow shaft 37. By shifting the tubular gear carrier 47 out of the neutral position shown in the drawings, the clutch teeth 62 thereof may be meshed with the clutch teeth 63 of the flange 46 on the fixed sleeve 45, thereby creating the first planetary gear reduction for take-off and low pitch propeller adjustment. By shifting said tubular gear carrier 47 so as to bring its other clutch teeth 64 into engagement with the clutch teeth 65 on the flange 66 of the sleeve 67 of the second internal gear 71, there is brought into action the second planetary gear reduction for high pitch propeller adjustment and airplane high speed.

Figure 5:
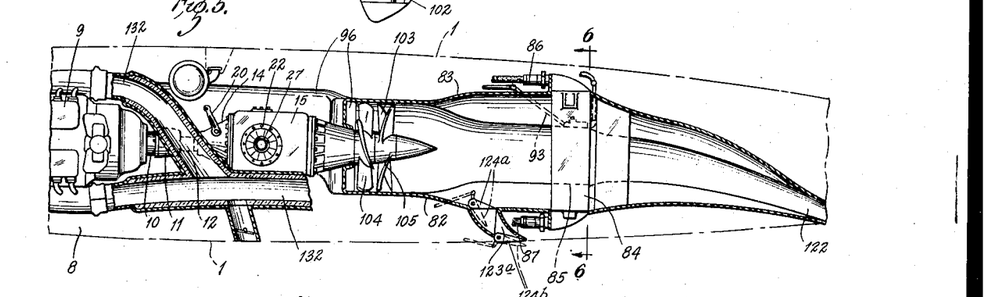
Fig. 5 is a longitudinal sectional view through the power plant cooling system.
Figure 6:
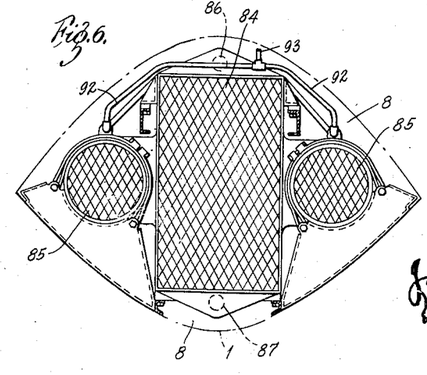
Fig. 6 is a sectional view on the line 6—6 in Fig. 5.
Figure 23:
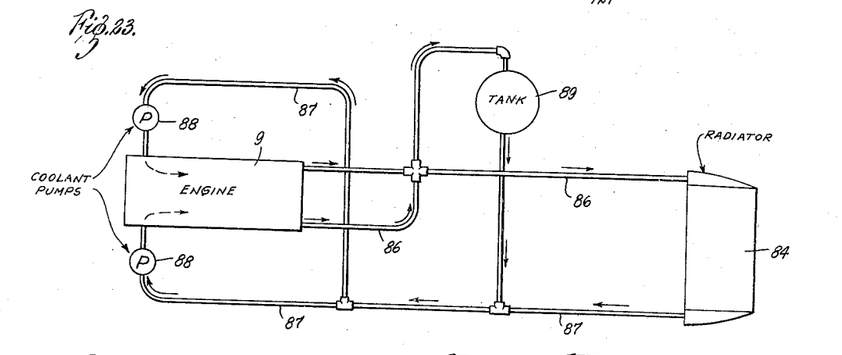
Fig. 23 is a diagram of the system for cooling the engine coolant.

Mounted in the fuselage 1, rearwardly of the engine 9, in a housing 82 having an enlarged middle portion 83 is a radiator system comprising an enlarged middle radiator section 84 and small sections or portions 85 on either side thereof, the middle section 84 cooling liquid coolant for the engine and the side sections 85 cooling the lubricant for the engine. The details of radiator construction are not essential to the present invention and are not shown. Extending from the engine 9 to the upper portion of the central radiator section 84 is a line 86 through which warm coolant flows from the engine 9 to the radiator 84 and extending from the lower portion of the radiator 84 to the engine 9 is a line 87 from which cooled coolant returns to the engine from the radiator, pumps 88 being located in the line for maintaining flow of the coolant. As is indicated diagrammatically, a suitable tank 89 or reservoir may be provided, which is connected with the coolant line 87 extending from the radiator to the engine.

Figure 24:
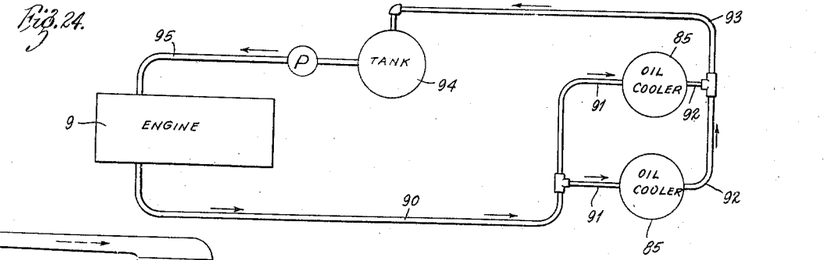
Fig. 24 is a diagram of the system for cooling the engine lubricant.

A lubricant line 90 from the engine has branches 91 that feed lubricant to the side radiator sections 85. Extending from the side sections 85 are discharge lines 92 that communicate with a return line 93 that delivers oil to a tank 94 mounted ahead of the engine 9 adjacent to the fire wall 6. A line 95 leads from the tank to the engine. The oil circulation system may be provided with other customary and desirable features, as a pump, by-pass relief valves and so on.

Opening into the front or inlet portion of the radiator housing 82 are air ducts 96 which extend at an angle through the curved connecting sections between the fuselage and wing structure and then substantially parallel with the rear or trailing edges 97 of the wings 2. Said ducts 96 are provided with suitable supporting means as webs or ribs 98 that extend from the front portions to the rear portions of the wings and that have openings 99 shaped to 't the ducts 96 and afford suitable support therefor. Some of such ribs 98 are indicated in dash lines in Fig. 2. Said ducts 96 are preferably disposed rearwardly of the center line of the wings, as from 50 to 90 percent of the distance from the leading edges 100 of the wings to the trailing edges. The ducts 96 shown in the drawings are approximately three-fourths of the distance from the front 100 to rear edges 97 of the wings. Extending from support 98 to support 98 and projecting from each duct 96 to the upper surface of a wing are a multiplicity of forwardly inclined inlet ports 101, whose mouths are in the form of elongated slots extending substantially parallel with the rear edges of the wings. Stiffening ribs 102 are provided at the wing surface between the mouths of said inlet ports and in line with said webs.

Mounted in the radiator housing 82 is a counter rotating double fan, indicated generally by 103, having a front member 104 rotating in one direction and a rear member 105 rotating in the opposite direction, the fan blades being so disposed that the flow from each fan member is toward the radiator 84.

The drive shaft 16 has secured thereto an internal gear 106 which meshes with the teeth of a plurality of pinions 107 mounted on stub shafts 108 that are secured in a wall 109 of the housing 15. Said pinions 107 mesh with a gear 110 on the end of a hollow shaft 111 that is mounted in axial alinement with said drive shaft 16. Roller bearings 112 are interposed between the hollow fan shaft 111 and said housing wall 109. Fixed on said hollow shaft 111 is a gear 113 which meshes with gears 114 on either side thereof that are mounted on shafts 115 secured in suitable supporting arms 116 projecting from said housing wall 109. Said side gears 114 mesh with a gear 117 on the end of a hollow shaft 118 which surrounds said fan shaft 111 and is rotatably supported thereon at each end by means of roller bearings 119, a ball bearing 120 being interposed between the outer periphery of said hollow sleeve 118 and a nosing portion 121 of the housing 15. The foremost fan member 104 is fixed on said hollow sleeve 118 and the rearmost fan member 105 is fixed on the hollow shaft 111 which extends through said sleeve 118 and is driven by the internal gear.

The fan 103 is always interconnected with the countershafts 27, and both are normally driven from the engine 9, when the splined clutch 19 is moved to couple the engine shaft 10 and the drive shaft 16. The fan obviously forces a current of air through the central and side radiator sections, thus cooling the engine coolant and the engine lubricant.

The outlet or discharge portion 122 of the radiator housing tapers downwardly and rearwardly, the discharge opening 123 being disposed at the bottom of the tail portion of the fuselage at such an angle and at such a level that the outflowing current of air will clear the airplane structure and will flow at substantially the speed of the airplane and parallel to the flight path thereof, thus creating the minimum disturbance and drag. A manually operated flap 124 at the discharge portion of the radiator housing is connected by suitable linkage (not shown) to an operating handle in the pilot's compartment. This handle is operated to control the flow of air to the outlet opening.

As appears hereinbefore, the fan drive mechanism remains in geared connection with the countershafts 27 when the clutch 19 is actuated to disengage the drive shaft 16 from the engine shaft 10. When the engine is thus disengaged, the propellers 4 will windmill and thus drive fan members 103 and 104 through the countershafts and the fan gearing. An outlet tube 123a is provided in the radiator housing forward of the radiator. A closure 124a is provided for said outlet in the housing wall and a closure 124b is provided in the fuselage surfaces. These closures may be opened, when the propellers are windmilling to provide a by-pass for air around the radiator. This drive of the fan through the windmilling propellers has important advantages, as is hereinafter pointed out.

Figure 22:
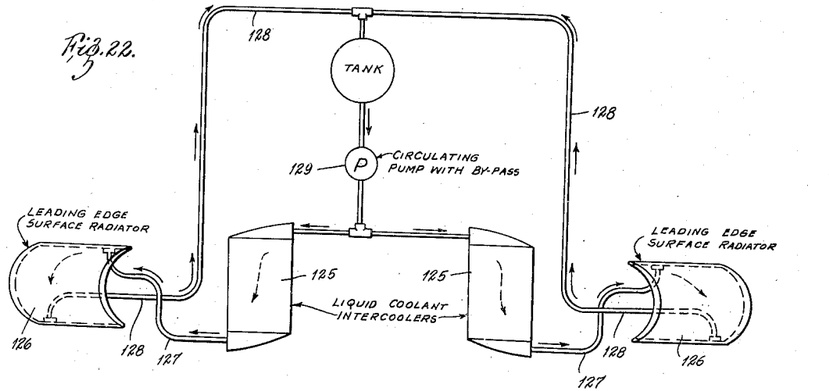
Fig. 22 is a diagram of the system for cooling the intercooler coolant.
Figure 25:
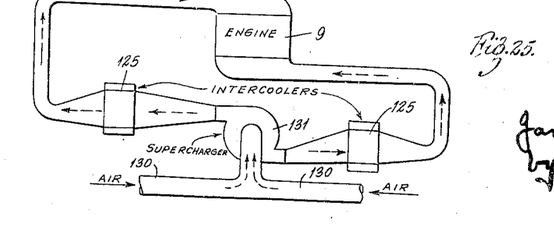
Fig. 25 is a diagram of the system for cooling the supercharged air for the engine.

The engine is shown as being provided with an intercooler system for cooling the supercharged air for the engine. A double intercooler 125 is shown diagrammatically, but any well known type of intercooler may be used, my invention being concerned with the cooling of the supercharged air and the cooling of the coolant for the intercooler. Mounted in the leading edges 100 of the wings, at the curving section where the wings merge into the fuselage are surface radiators 126 of any desired type. Extending from the intercoolers 125 to the forward end or section of each skin radiator 126 is a line 127 that takes the coolant from the intercooler 125 to said radiator 126 and extending from the rear end or section of each radiator is a line 128 that returns the cooled coolant to the intercooler, a suitably driven pump 129 being provided for maintaining the flow of coolant. Opening into the atmosphere at points just ahead of the radiators are intake ducts 130 for supplying air for the engine, said ducts opening into a suitable supercharger 131. From the supercharger, the compressed air passes through the intercooler 125 and thence to the engine 9. The details of supercharger and air feed arrangement are not part of the present invention and are not shown in the drawings.

Figures 26, 27, 28, 29:
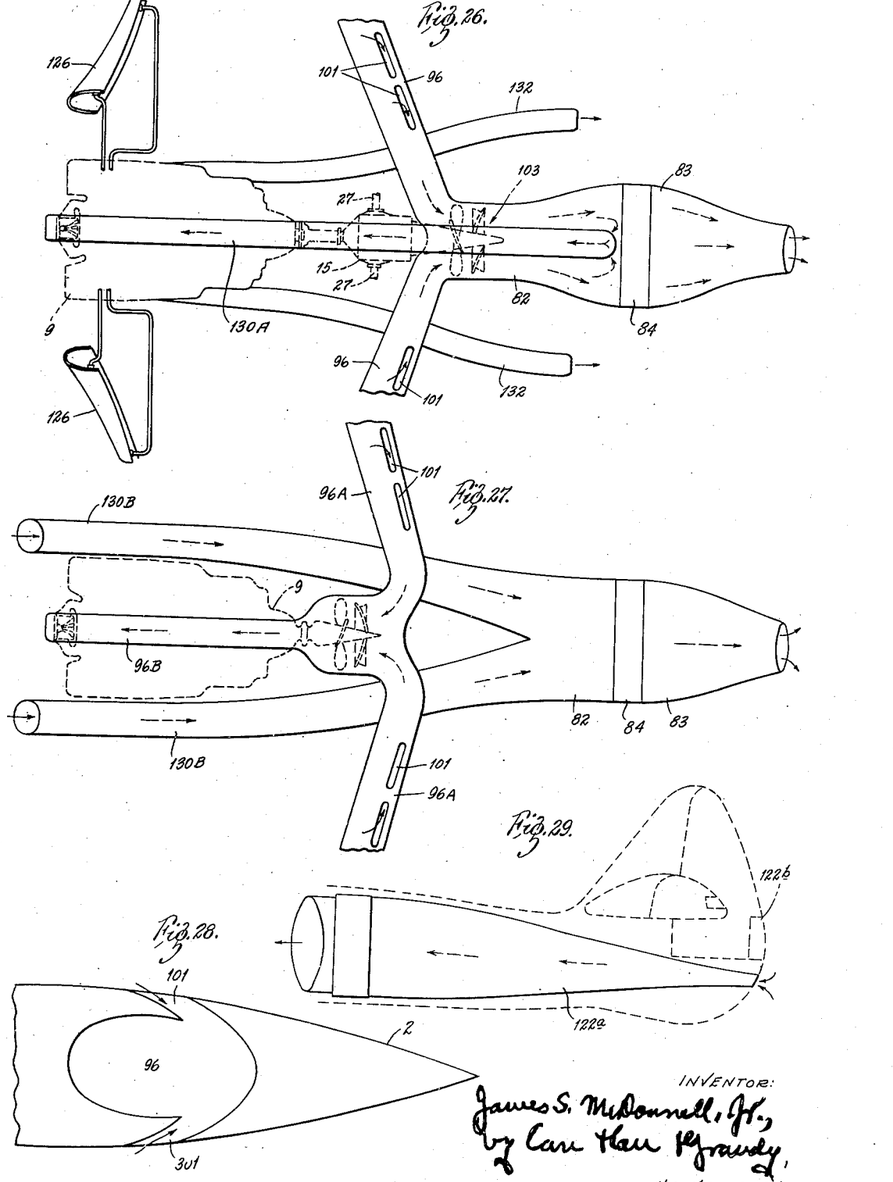
Fig. 26 is a diagrammatic view of a modified arrangement for supplying additional air for engine combustion.
Fig. 27 is a diagrammatic view of a modified arrangement for supplying engine combustion air and radiator cooling air.
Fig. 28 is a diagrammatic view, similar to Fig. 19, of a modification.
Fig. 29 is a diagrammatic view of a modified arrangement showing the discharge housing extended to the tail.

As shown in Fig. 26, an engine air intake duct 130A may extend from a high pressure, low velocity point in the housing 82, ahead of the radiator 84, to the engine blower.

As shown in Fig. 27, the supply of engine air and that of radiator cooling air may be reversed from the disclosure of Fig. 2. In this modification, the wing air ducts 96A open into a line 96B that supplies air for the engine, and the forward air intake ducts 130B open into the radiator housing and supply air thereto.

The exhaust manifolds 132 of the engine extend rearwardly and thence angularly outwardly, opening into the surfaces of the tail section of the fuselage at about the points where the wings merge thereinto. These exhaust outlets are so disposed that the flow of exhaust gases clears all parts of the airplane structure, being to the rear of the propellers and clear of all other parts.

Instead of the two speed propeller transmission shown in the drawings, a single speed mechanical transmission may be used, or a multiple speed transmission. Instead of the mechanical drive shown for the propellers and for the radiator fan, a hydraulic drive may be provided.

Figure 21:
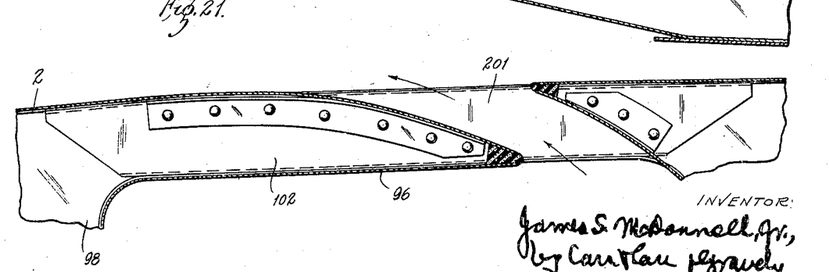
Fig. 21 is a vertical sectional view similar to Fig. 19 of a modification.

Instead of the air for the radiator being taken in through the ports 101 and ducts 96 and delivered to the radiator, the flow of air may be reversed, coming in through the rear end of the radiator housing, past the radiators and thence outwardly through the ducts and ports. If this airflow is used, I prefer to change direction of inclination of the outlet ports 201, as shown in Fig. 21, so that the air leaving the ports 201 will continue in the path started by the inclination of the ports themselves. Continuous exhaust of the air through the ports 201 increases the lift coefficient and gives control over the boundary layer of the wing. It is also possible to extend the outlet or discharge portion 122a of the housing rearwardly through the tail 122b, as shown in Fig. 29. This arrangement is particularly likely to be preferred if the opening 122a is to be the inlet as set forth in the preceding paragraph.

In the modification shown in Fig. 28, inlet ports 301 are provided that open into the under surfaces of the wings, in addition to the inlet ports 101 in the upper surfaces of the wings. In this arrangement ports 101 may be omitted.

The functions and advantages of the construction are believed to be clear from the foregoing descriptions, but may be briefly summarized. The system for cooling the engine coolant and the engine lubricant is very effective in operation and the air passing through the cooling system is utilized to improve the aerodynamic functioning of the airplane.

The fan for the cooling system performs a very important function in dead engine landings, when it is driven by the propellers. In the first place, the windmilling of the propellers causes a drag which materially increases the steepness of the glide of the airplane. In the second place, the flow of air through the ducts from the wing surface greatly increases the wing lift coefficient. It is thus possible to land the airplane at a much slower speed and at a much steeper angle than would otherwise be possible.

The arrangement of the air ducts helps to maintain a better airflow over the wings at all angles of attack of the wings, particularly when flying at high angles of attack and at a speed approaching stall speed. Under such conditions, this wing boundary layer control appreciably increases the angle of attack at which the wing tip will stall thus obtaining lateral control and safe flying at higher angles of attack.

Intake of air through the ports 101 or ejection of air through the ports 201 also decreases the drag coefficient and increases the lift coefficient in such way that the maximum lift over drag ratio is increased, thus increasing the maximum range of the airplane.

The use of liquid coolant for the intercooler and for the engine avoids the drag that results from the air cooling commonly in use. The intercooler cooling system is very efficient in operation.

Obviously many changes may be made in details of constructions and arrangement of various parts, without departing from the invention. For instance, in a multi-engine airplane, the radiators and cooling fans may be disposed in the wings, rather than in the fuselage. Accordingly, I do not wish to be limited to the precise construction shown.

What I claim is:

1. In an airplane having a fuselage, wings, an engine in said fuselage having a liquid cooling system and two pusher propellers transmission means operatively connecting said engine and said propellers, a radiator housing in said fuselage rearwardly of said engine having a radiator mounted therein, said radiator communicating with said engine cooling system, ducts extending through said wings near the rear edges thereof, ports for said ducts opening into the atmosphere through surfaces of said wings, said ducts communicating with said radiator housing, a fan in said radiator housing and operatively connected with said transmission means for propelling air through said radiator, said fan being always operatively connected with the propeller operating mechanism, and means for disconnecting the propeller operating mechanism from the engine.

2. An airplane comprising a fuselage, wings extending from the sides thereof, an engine in said fuselage with its output shaft extending longitudinally of the fuselage, a drive shaft in alinement with said engine shaft, a clutch for connecting and disconnecting said engine shaft and drive shaft, a countershaft extending into each wing, each countershaft being connected to said drive shaft by gearing to be driven thereby, a propeller shaft in each wing, a propeller on each propeller shaft, the outermost end of each countershaft being operatively connected to one of said propeller shafts, a housing in said fuselage opening into the atmosphere, a fan in said housing, drive gearing for said fan operatively connected with said drive shaft whereby said fan is normally driven by said engine and is driven by the windmilling of the propellers when said clutch is disengaged, ducts in said wings communicating with said housing and ports for said ducts opening into the atmosphere.

3. An airplane comprising a fuselage, wings extending from the sides thereof, an engine in said fuselage with its output shaft extending longitudinally of the fuselage, a drive shaft in alinement with said engine shaft, a clutch for connecting and disconnecting said engine shaft and drive shaft, a countershaft extending into each wing, each countershaft being connected to said drive shaft by gearing to be driven thereby, a propeller shaft in each wing, a propeller on each propeller shaft, the outermost end of each countershaft being operatively connected to one of said propeller shafts by change speed gearing, said change speed gearing including a clutch, a housing in said fuselage opening into the atmosphere, a fan in said housing, drive gearing for said fan operatively connected with said drive shaft whereby said fan is normally driven by said engine and is driven by the windmilling of the propellers when said clutch is disengaged, ducts in said wings communicating with said housing and ports for said ducts opening into the atmosphere.

JAMES S. McDONNELL, Jr.